US012752649B2

(12) United States Patent
Ohn et al.

(10) Patent No.: US 12,752,649 B2
(45) Date of Patent: Oct. 6, 2026

(54) SYSTEM AND METHOD FOR CONTROLLING VEHICLE BATTERY

(71) Applicants: Hyundai Motor Company, Seoul (KR); Kia Corporation, Seoul (KR)

(72) Inventors: Hyung Seuk Ohn, Seoul (KR); Jung Hwan Bang, Seoul (KR); Dong Hoon Jeong, Seongnam-si (KR); Won Seok Jeon, Anyang-si (KR); Ki Sang Kim, Seoul (KR); Byeong Wook Jeon, Seoul (KR); Dong Hoon Won, Suwon-si (KR); Hee Yeon Nah, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 870 days.

(21) Appl. No.: 17/982,118

(22) Filed: Nov. 7, 2022

(65) Prior Publication Data

US 2024/0010085 A1 Jan. 11, 2024

(30) Foreign Application Priority Data

Jul. 11, 2022 (KR) ........................ 10-2022-0085148

(51) Int. Cl.
*B60L 53/22* (2019.01)
*B60L 53/53* (2019.01)
(Continued)

(52) U.S. Cl.
CPC ............... *B60L 53/22* (2019.02); *B60L 53/53* (2019.02); *B60L 58/13* (2019.02);
(Continued)

(58) Field of Classification Search
CPC .......... B60L 53/22; B60L 53/53; B60L 58/13; B60L 58/12; B60L 1/02; B60L 7/10;
(Continued)

(56) References Cited

U.S. PATENT DOCUMENTS

2016/0126768 A1* 5/2016 Fust ...................... G06F 13/385 710/63
2018/0141455 A1* 5/2018 Jeon ...................... B60W 10/26
(Continued)

OTHER PUBLICATIONS cer-rec.gc.ca [online], "Market Snapshot: Levelized costs of driving EVs and conventional vehicles," Jun. 5, 2019, retrieved on Oct. 21, 2022, retrieved from URL<https://www.cer-rec.gc.ca/en/data-analysis/energy-markets/market-snapshots/2019/market-snapshot-levelized-costs-driving-evs-conventional-vehicles.html>, 6 pages.
(Continued)

*Primary Examiner* — Rexford N Barnie
(74) *Attorney, Agent, or Firm* — Fish & Richardson P.C.

(57) ABSTRACT

A system for controlling a vehicle battery includes a vehicle which includes a motor that provides a driving force or generates power through regenerative braking and a battery that provides power to the motor and calculates a battery usage according to use of the battery, and a portable terminal which obtains location information of a user, generates a battery charge/discharge guide based on the location information of the user and the battery usage received from the vehicle, and transmits the battery charge/discharge guide to the vehicle, thus minimizing anxiety and inconvenience to users when charging and discharging an electric vehicle, and also minimizing the maintenance cost of the electric vehicle.

18 Claims, 13 Drawing Sheets

(51) Int. Cl.
*B60L 58/13* (2019.01)
*B60W 30/18* (2012.01)
*B60W 40/08* (2012.01)
*B60W 40/09* (2012.01)

(52) U.S. Cl.
CPC ...... *B60W 30/18127* (2013.01); *B60W 40/09* (2013.01); *B60W 2040/0809* (2013.01); *B60W 2540/30* (2013.01); *B60W 2554/4041* (2020.02)

(58) Field of Classification Search
CPC ........... B60L 15/2045; B60L 2240/545; B60L 2240/68; B60L 2250/16; B60L 2260/46; B60L 2260/52; B60W 30/18127; B60W 40/09; B60W 2040/0809
USPC ......................... 320/104, 109, 132, 134, 137
See application file for complete search history.

(56) References Cited

U.S. PATENT DOCUMENTS

| | | | | |
|---|---|---|---|---|
| 2021/0078433 | A1* | 3/2021 | Cha ......................... | B60L 53/65 |
| 2021/0300191 | A1* | 9/2021 | Sakakibara ........... | B60L 53/305 |

OTHER PUBLICATIONS

Electric Vehicle Charging Tariff, Korea Electric Power Corporation, Apr. 1, 2022, 4 pages.

evadoption.com [online], "Stat of the week: Comparing the Ratio of EV Charging Stations Verses Gas Stations—EVs Win," Mar. 3, 2018, retrieved on Oct. 21, 2022, retrieved from URL<https://evadoption.com/stat-of-the-week-comparing-the-ratio-of-ev-charging-stations-versus-gas-stations-evs-win/>, 9 pages.

* cited by examiner

AMOUNT OF BATTERY CHARGE
ASSUMED THAT 100%=400km=75kwh

SYSTEM AND METHOD FOR CONTROLLING VEHICLE BATTERY

CROSS-REFERENCE TO RELATED APPLICATION

This application claims the benefit of priority to Korean Patent Application No. 10-2022-0085148, filed in the Korean Intellectual Property Office on Jul. 11, 2022, the entire contents of which are incorporated herein by reference.

TECHNICAL FIELD

The present disclosure relates to a system and method for controlling a vehicle battery.

BACKGROUND

Recently, with the expansion of electric vehicles, infrastructure for charging a vehicle battery should be expanded. However, the reality is that the infrastructure for charging electric vehicles is insufficient, and as a result, it can be difficult for a user to access the infrastructure for charging electric vehicles, resulting in the users' anxiety about discharging of a vehicle and inconvenience in charging.

Generally, the batteries of electric vehicles can be charged by regenerative braking using a motor during braking in addition to charging through the infrastructure and a drivable distance may vary depending on a user's driving path and driving pattern or external temperature. In addition, the amount of charge may be reduced due to deterioration of a battery due to repeated charging and discharging, and the charging cost is different according to slow charging and rapid charging. Accordingly, it can be possible to minimize the maintenance cost of an electric vehicle by using the above-described charging and discharging characteristics of the battery.

SUMMARY

An aspect of the present disclosure provides a system and method for controlling a vehicle battery, capable of minimizing anxiety and inconvenience to a user during charging and discharging of an electric vehicle and minimizing the maintenance cost of the electric vehicle.

According to an aspect of the present disclosure, a system for controlling a vehicle battery includes a vehicle which includes a motor that provides a driving force or generates power through regenerative braking and a battery that provides power to the motor and calculates a battery usage according to use of the battery, and a portable terminal which obtains location information of a user, generates a battery charge/discharge guide based on the location information of the user and the battery usage received from the vehicle, and transmits the battery charge/discharge guide to the vehicle.

The portable terminal may generate a movement pattern learning model by learning a movement path of the user based on the location information.

The portable terminal may receive the battery usage from the vehicle, and generate a battery usage learning model by learning the battery usage.

The portable terminal may predict a movement path of the vehicle based on the movement pattern learning model, predict a battery usage based on the battery usage learning model and generate the battery charge/discharge guide.

The vehicle may calculate the battery usage based on a movement path of the vehicle, a power usage of an in-vehicle load, and a power usage of an air conditioning device.

The vehicle may determine whether the user has selected the battery charge/discharge guide, when the battery charge/discharge guide is received.

The vehicle may output a predicted movement path and control charging and discharging of the battery according to the battery charge/discharge guide when it is determined that the battery charge/discharge guide is selected by the user.

The vehicle may perform battery conditioning of the battery when it is determined that the battery charge/discharge guide is selected by the user.

The vehicle may perform battery conditioning of the battery when it is determined that the battery charge/discharge guide is selected by the user.

The portable terminal may receive the selected information and re-learn the movement path of the user.

According to an aspect of the present disclosure, a method for controlling a vehicle battery includes obtaining, by a portable terminal, location information of a user, receiving, by the portable terminal, a battery usage according to use of the battery from the vehicle, generating, by the portable terminal, a battery charge/discharge guide based on the location information of the user and the battery usage received from the vehicle, and transmitting, by the portable terminal, the battery charge/discharge guide to the vehicle.

The method may further include generating, by the portable terminal, a movement pattern learning model by learning a movement path of the user based on the location information.

The method may further include receiving, by the portable terminal, the battery usage from the vehicle, and generating a battery usage learning model by learning the battery usage.

The method may further include predicting, by the portable terminal, a movement path of the vehicle based on the movement pattern learning model, predicting a battery usage based on the battery usage learning model and generating the battery charge/discharge guide.

The method may further include calculating, by the vehicle, the battery usage based on a movement path of the vehicle, a power usage of an in-vehicle load, and a power usage of an air conditioning device.

The method may further include determining, by the vehicle, whether the user has selected the battery charge/discharge guide, when the battery charge/discharge guide is received.

The method may further include outputting, by the vehicle, a predicted movement path and controlling charging and discharging of the battery according to the battery charge/discharge guide when it is determined that the user has selected the battery charge/discharge guide.

The method may further include performing, by the vehicle, battery conditioning of the battery when it is determined that the user has selected the battery charge/discharge guide.

The method may further include transmitting, by the vehicle, the selected information to the portable terminal when it is determined that the battery charge/discharge guide is selected by the user.

The method may further include receiving, by the portable terminal, the selected information and re-learning the movement path of the user.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some implementations of the present disclosure will be described in detail with reference to the exemplary drawings.

Figure 1:
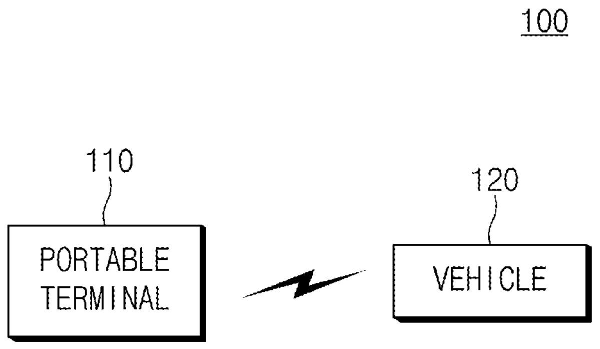
FIG. 1 is a diagram illustrating a configuration of an example system for controlling a vehicle battery according to an implementation of the present disclosure.

FIG. 1 is a diagram illustrating a configuration of a system for controlling a vehicle battery according to an implementation of the present disclosure.

Referring to FIG. 1, a system for controlling a vehicle battery 100 may include a portable terminal 110 and a vehicle 120.

The portable terminal 110 may obtain location information of a user, generate a battery charge/discharge guide based on a battery usage (i.e., battery usage information) received from the vehicle 120, and transmit the battery charge/discharge guide to the vehicle 120. A more detailed description will be given with reference to FIG. 2.

The vehicle 120 may obtain battery charging information of the user, calculate the battery usage, and transmit the calculated battery usage to the portable terminal 110. A more detailed description will be given with reference to FIG. 3.

Figure 2:
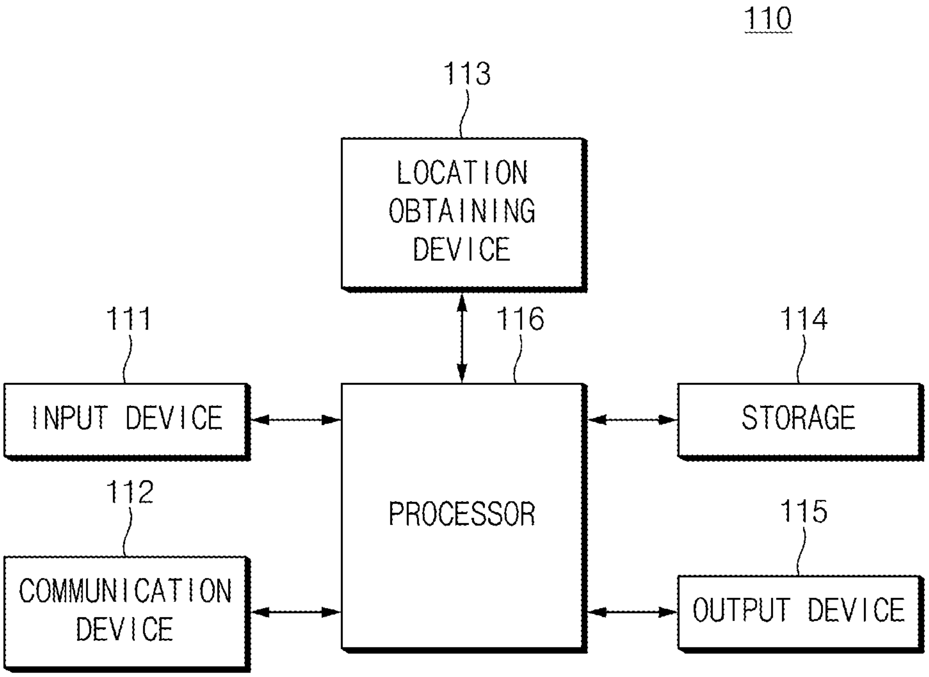
FIG. 2 is a diagram showing a configuration of an example portable terminal according to an implementation of the present disclosure.

FIG. 2 is a diagram showing a configuration of a portable terminal according to an implementation of the present disclosure.

Referring to FIG. 2, the portable terminal 110 may include an input device 111, a communication device 112, a location obtaining device 113, storage 114, an output device 115, and a processor 116.

The input device 111 may receive an input corresponding to a user's operation, motion, or voice and transmit the received input to the processor 116. According to an implementation, the input device 111 may include a touch input means or a mechanical input means, through which a user schedule may be input. The input schedule information (meeting, anniversary, birthday, or the like) may be stored in the storage 114.

The communication device 112 may perform wireless communication with the vehicle 120 and a server. According to an implementation, the communication device 112 may communicate with the vehicle 120 and a server in various wireless communication methods including, for example, Wi-Fi, WiBro, Global System for Mobile Communication (GSM), Code Division Multiple Access (CDMA), Wideband Code Division Multiple Access (WCDMA), Universal Mobile Telecommunication System (UMTS), Time Division Multiple Access (TDMA), Long Term Evolution (LTE). In some cases, the server can include one or more computers configured to provide functions and/or data storage to one or more client computers, terminals, processors, applications, or the like. The server can include one or more processors and/or one or more non-transitory memory devices. In some cases, the server can include a cloud server that provides one or more clients with functions and data storage by computer systems distributed over multiple locations.

The location obtaining device 113 may be provided with a GPS receiver to obtain the user's location. Because the portable terminal 110 can be carried by the user, the user's location obtained according to an implementation of the present disclosure can indicate the location of the portable terminal. The location obtaining device 113 may perform map matching of the user's location to previously stored map data.

The storage 114 may store at least one or more algorithms for performing operations or execution of various commands for the operation of the portable terminal according to an implementation of the present disclosure. Also, the storage 114 may store schedule information input by a user and user location information, and may store a learning model generated by the processor 116. The storage 114 may include at least one medium of a flash memory, a hard disk, a memory card, a Read-Only Memory (ROM), a Random Access Memory (RAM), an Electrically Erasable Programmable Read-Only Memory (EEPROM), a Programmable Read-Only Memory (PROM), a magnetic memory, a magnetic disk, and an optical disk, just to name a few possible examples.

The output device 115 may output an image or sound under the control of the processor 116. According to an implementation, the output device 115 may include a display device or a sound output device.

The processor 116 may be implemented by various processing devices such as a microprocessor incorporating a semiconductor chip capable of operating or executing various instructions or the like and may control an operation of the portable terminal according to an implementation of the present disclosure.

The processor 116 may receive key-on information from the vehicle 120. The key-on information can refer to startup information. The processor 116 may obtain key-on time point information. Here, the key-on time point information may include a date, a day of the week, a time, and the like.

The processor 116 may obtain traffic information and weather information (e.g., temperature) around a key-on location from the server.

The processor 116 may obtain user location information after the key-on time point. According to an implementation, the processor 116 may obtain location information according to the movement of the user after the key-on time point. Because the user is able to move in a vehicle, the user location information may be obtained from the location information of the vehicle. Also, because the portable terminal is carried by the user, the user location information may be obtained from the location of the portable terminal.

The processor 116 may store location information according to the user's movement after performing map matching of the location information to a pre-stored map.

The processor 116 may determine whether the vehicle 120 is in a key-off state at a predetermined time period. According to an implementation, the processor 116 may determine that the vehicle 120 is in a key-off state when receiving key-off information from the vehicle 120. When it is determined that the vehicle 120 is in the key-off state, the processor 116 may collect information obtained after the key-on time point.

The processor 116 may obtain and collect user location information from the key-on time point to the key-off time point during a predetermined period (e.g., 7 days), and when the predetermined period has elapsed, learn a movement path and a movement pattern for each key-on time point (date, day of the week, and time) based on information collected for the predetermined period. The processor 116 may generate a movement pattern learning model based on information collected for a predetermined period.

In addition, the processor 116 may receive specification information (e.g., vehicle weight, in-vehicle load information, and the like) from the vehicle 120, and receive a battery usage. The processor 116 may obtain and collect user location information and a battery usage from the key-on time point to the key-off time point during a predetermined period (e.g., 7 days). According to an implementation, the processor 116 may collect the battery usage from the vehicle based on the usage of an in-vehicle load (electronic device) and the usage of an air conditioner.

When a predetermined period has elapsed, the processor 116 may learn the battery usage according to the movement path for each key-on time point (date, day of week, time) based on information collected during the predetermined period. The processor 116 may generate a battery usage learning model based on information collected for a predetermined period. A more detailed description will be given with reference to FIG. 3.

Figure 3:
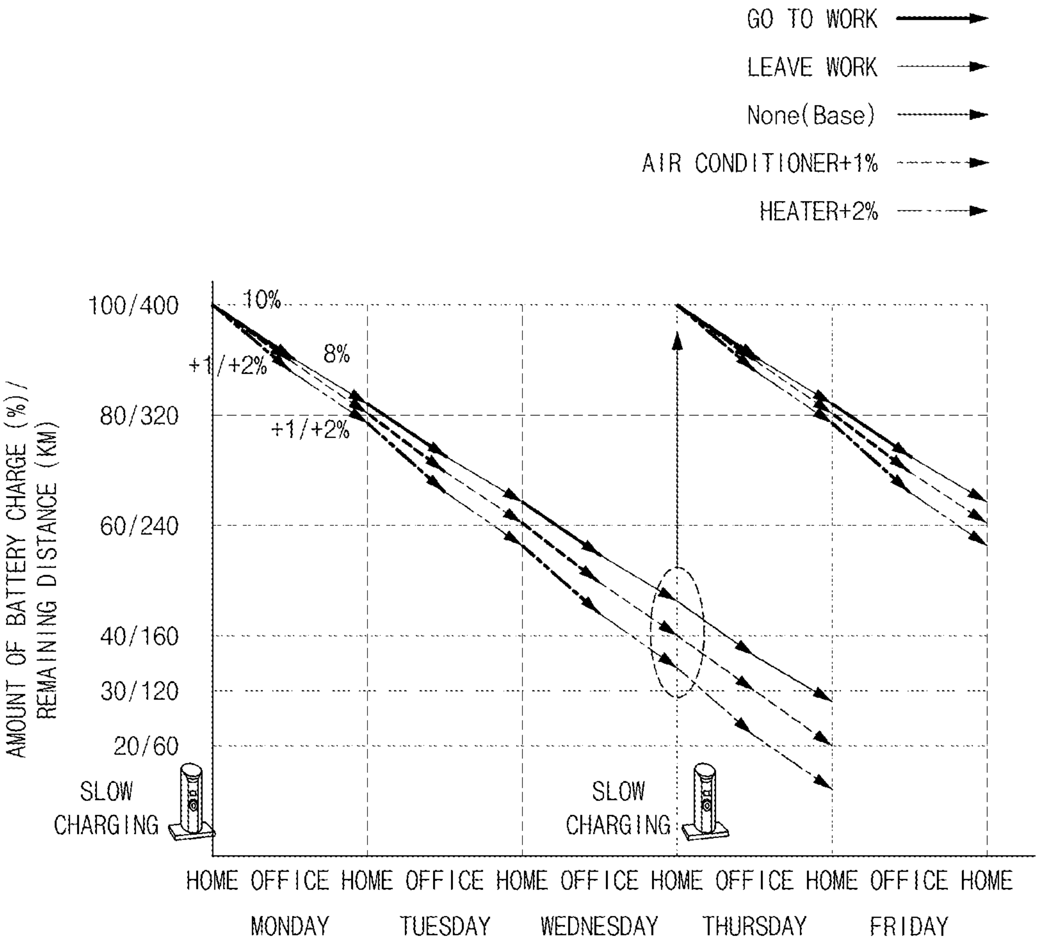
FIG. 3 is a diagram schematically illustrating information obtained to generate a movement pattern learning model and a battery usage learning model according to an implementation of the present disclosure.

FIG. 3 is a diagram schematically illustrating information obtained to generate a movement pattern learning model and a battery usage learning model according to an implementation of the present disclosure.

Referring to FIG. 3, the processor 116 may obtain a key-on location and a key-off location of a vehicle, the user location information after the key-on (movement information of the vehicle), a battery usage from the key-on time point to the key-off time point, and the user's charging pattern. The processor 116 may determine the minimum remaining battery capacity required by a user based on the user's charging pattern.

To help illustrate, according to the implementation of FIG. 3, the processor 116 may determine, based on the obtained information, that the movement distance from the user's home to the company is 30 km and the battery usage is 10% and that the battery usage is 8% because the battery is recharged by regenerative braking due to many downhill roads when moving from the company to home. The processor 116 may determine that the battery usage increases by 1% in summer because the air conditioner is used, the battery usage increases by 2% in winter because heating and heating wires are used, and the minimum remaining battery capacity required by the user is 30%. Accordingly, the processor 116 may generate a user movement pattern learning model and a battery usage learning model based on the above-described information.

The processor 116 may obtain the user's schedule and the location of the vehicle, predict the battery usage based on the movement pattern learning model and the battery usage learning model, and generate a battery charge/discharge guide by predicting the battery usage. The battery charge/discharge guide is customized to a user according to a change in season, day of the week, and time to guide a target amount of charge, a charging time zone, a charging location, a charging method (quick charging or slow charging), a charging cost, a charging time, and battery conditioning based on the minimum battery capacity required by the user and guide an available battery usage to an in-vehicle load (electronic device). A more detailed description related thereto will be given with reference to FIGS. 4 to 8.

FIGS. 4 to 8 are diagrams schematically illustrating charging and discharging of a battery according to an implementation of the present disclosure.

Figure 4:
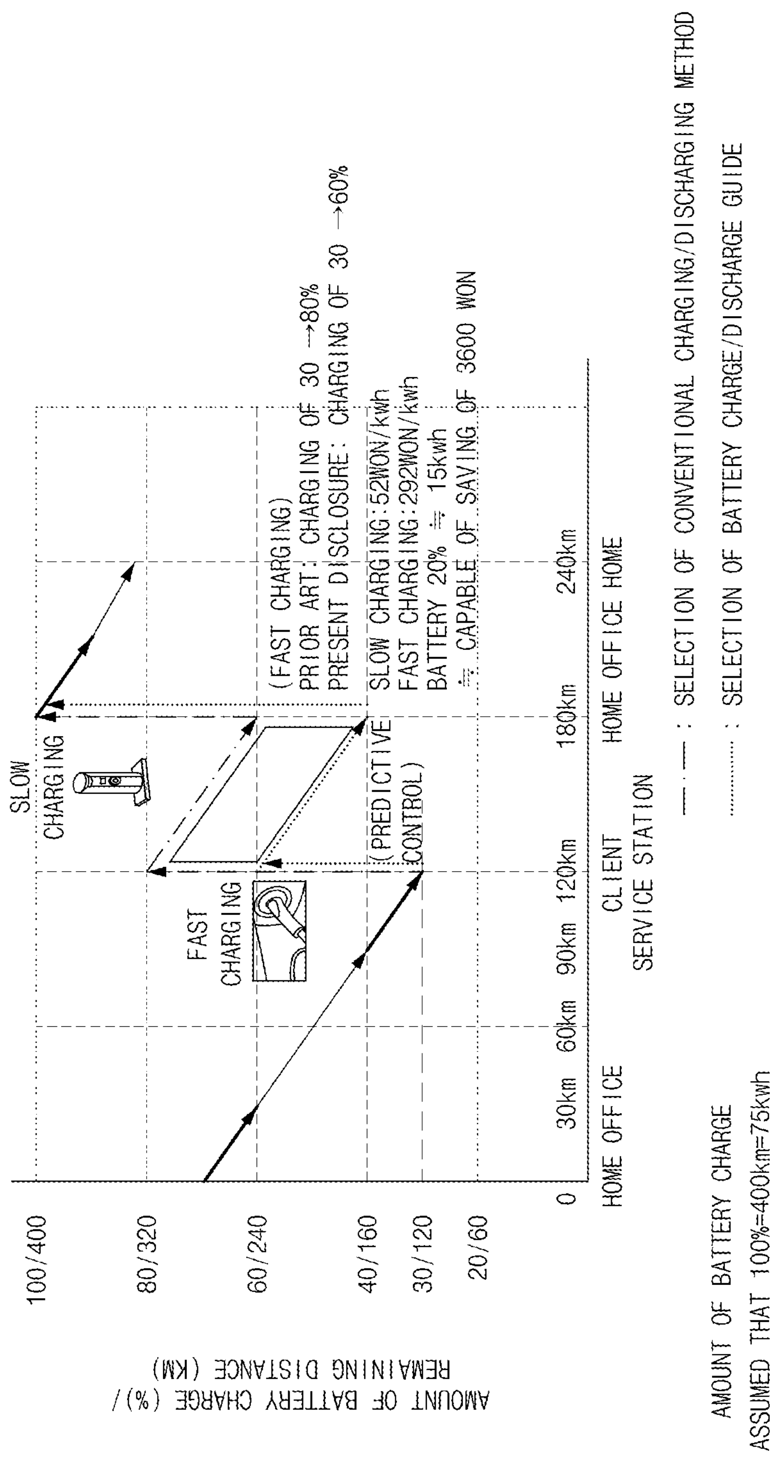
FIGS. 4 to 8 are diagrams schematically illustrating charging and discharging of a battery according to an implementation of the present disclosure.

Referring to FIG. 4, the processor 116 may obtain business trip information based on a user's schedule, and predict the additional battery usage by 20% because a movement distance from the company to a business trip site (client) is 60 km. Accordingly, the processor 116 may predict a current available battery usage (e.g., 70%), a movement distance from home to the business trip site (90 km), and a battery usage (40%), generate a battery charge/discharge guide that suggests charging with a charger before going to work. However, when it is determined that charging is hard using the slow charger, the processor 116 may regenerate the battery charge/discharge guide that suggests fast charging at a service station on the way back home, calculate a required battery capacity (e.g., 30%) using a movement distance from the service station to home, and suggest charging using the fast charger by only the required battery capacity and then charging the battery to 100% using the slow charger after returning home. Because the performance of the battery decreases during fast charging, and the usage fee increases when charging using a slow charger, the processor 116 may calculate a required battery capacity required for the vehicle to move when rapid charging is unavoidable, and generate a battery charge/discharge guide that suggests rapid charging only by the required battery capacity, minimizing rapid charging to prevent degradation of the performance of the battery and reducing a cost.

Figure 5:
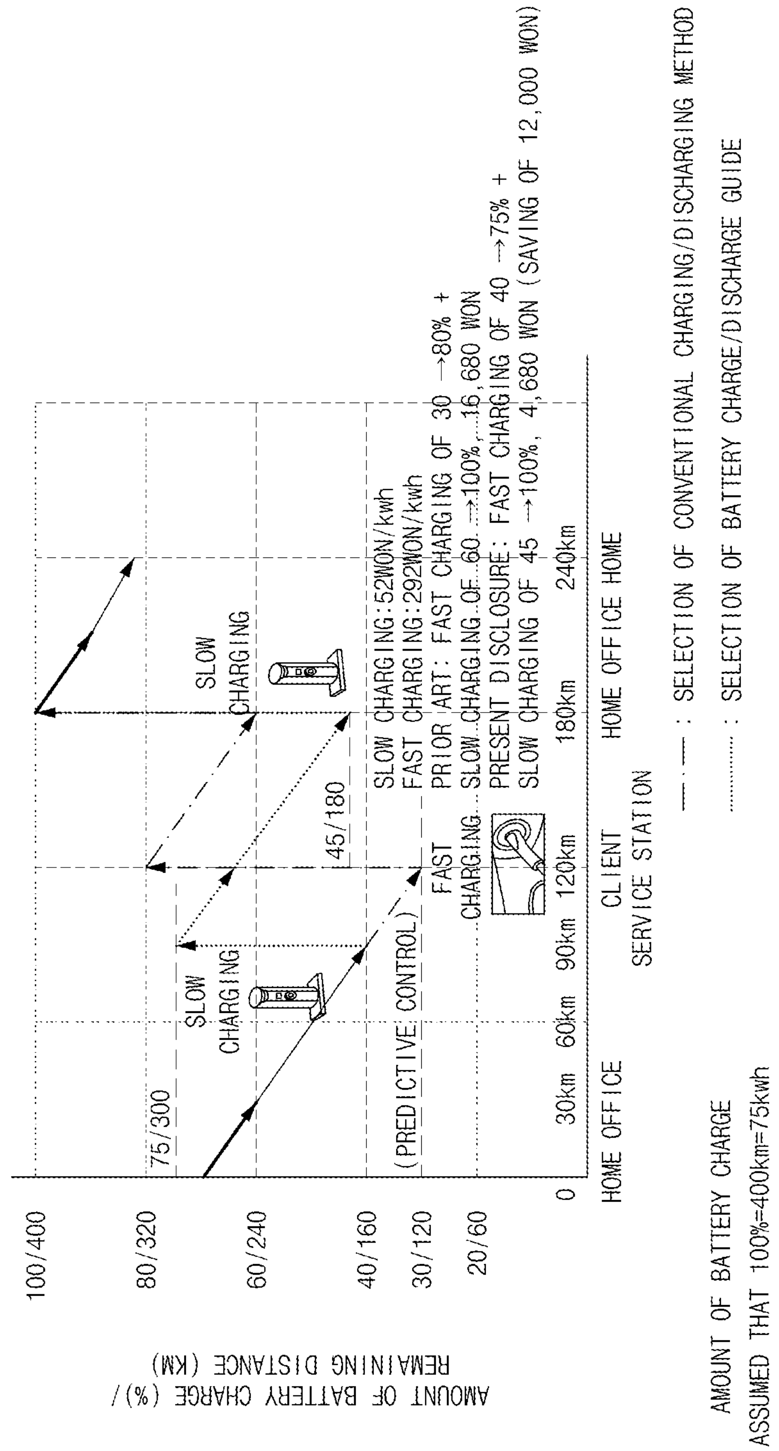

Referring to FIG. 5, the processor 116 may obtain business trip information based on a user's schedule, and predict the additional battery usage as 20% because a movement distance from the company to a business trip site (client) is 60 km. Accordingly, the processor 116 may predict a current available battery capacity (e.g., 70%), a movement distance from home to a business trip site (90 km), and a battery usage (40%), and generate a battery charge/discharge guide that suggests battery charging with a slow charger, before going to work. However, when it is determined that charging is hard using the slow charger, the processor 116 may generate a battery charge/discharge guide that suggests slow charging using a slow charger around a business trip site during a time to be spent at a business trip. For example, assuming that it takes 11 hours to fully charge (100%) a battery with a slow charger, the battery may be charged up to 75% when slow charging is performed at the business trip site because the battery is able to be charged by about 35% when the time to stay at a business trip site is 4 hours. The processor 116 may suggest charging of the battery by 100% using a slow charger after returning home. The processor 116 may generate a battery charge/discharge guide capable of minimizing charging using a rapid charger to prevent deterioration of performance of the battery and reduce costs.

Figure 6:
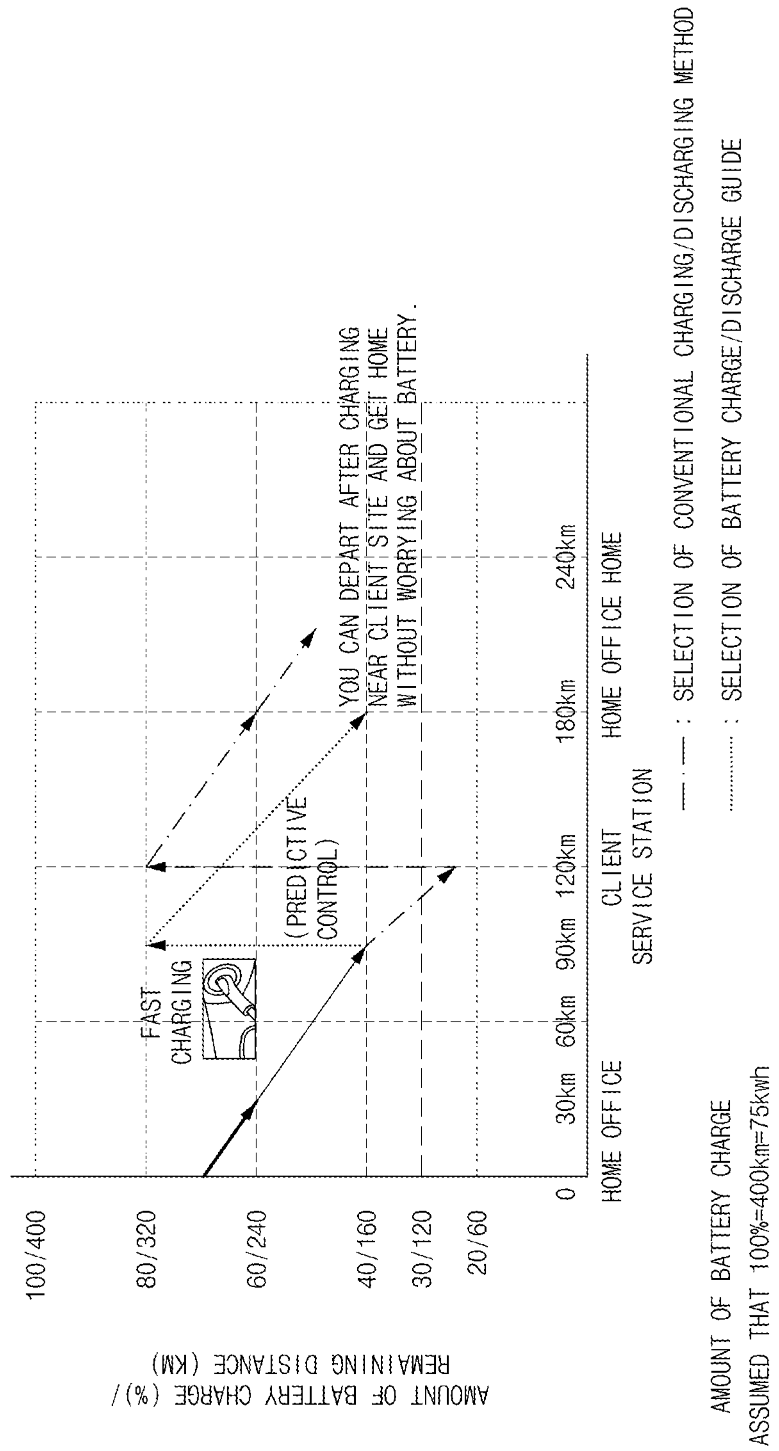

Referring to FIG. 6, the processor 116 may obtain business trip information based on a user's schedule, and predict an additional battery usage as 20% because a movement distance from the company to a business trip site (client) is 60 km. Accordingly, the processor 116 may predict a current available battery capacity (e.g., 70%), a movement distance from home to a business trip site (90 km), and a battery usage (40%), and generate a battery charge/discharge guide that suggests battery charging with a slow charger, before going to work. However, when it is determined that charging cannot be performed using a slow charger, the processor 116 may regenerate a battery charge/discharge guide. When the return time point is a rush hour at Friday, the processor 116 may predict traffic congestion and generate a battery charge/discharge guide that suggests charging near the business trip site instead of fast charging at a service station on the way home. According to an implementation, the processor 116 may allow the battery to be charged up to 80%. The processor 116 may allow the battery to be charged using a slow charger when the battery is able to be charged while staying in a business trip site, and allow the battery to be charged using a fast charger when there is insufficient time to charge the battery. Accordingly, as an example, the processor 116 may prevent a driver from getting anxious while driving without turning on an air conditioner even when the outside weather is cold or hot because the driver cannot arrive at a service station due to traffic jam.

When the movement pattern learning model and the battery usage learning model are generated, the processor 116 may obtain the user's schedule and the location of the vehicle, and determine whether the vehicle departs after a predetermined time (e.g., 30 minutes) from the current time point. When it is determined that the vehicle departs after a predetermined time (e.g., 30 minutes) from the current time point, the processor 116 may receive information on the state of charge and temperature of a battery from the vehicle 120.

Figure 7:
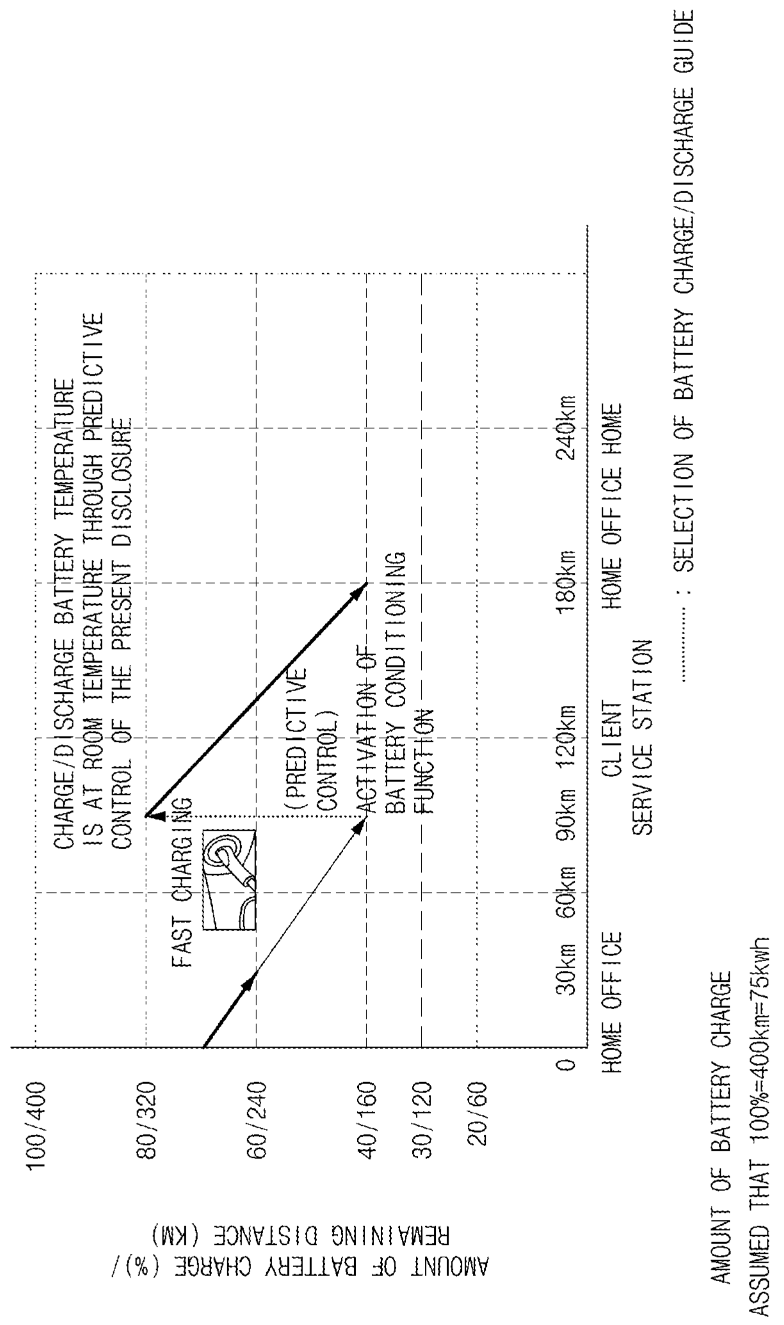

Referring to FIG. 7, the processor 116 may obtain business trip information based on a user's schedule, and predict the additional battery usage as 20% because a movement distance from the company to a business trip site (client) is 60 km. Accordingly, the processor 116 may predict a current available battery capacity (e.g., 70%), a movement distance from home to a business trip site (90 km), and a battery usage (40%), and generate a battery charge/discharge guide that suggests battery charging with a slow charger, before going to work. However, when it is determined that charging cannot be performed using a slow charger, the processor 116 may generate a battery charge/discharge guide that suggests charging of the battery at the business trip site.

The processor 116 may obtain information on the state of charge and temperature of the battery from the vehicle 120, and generate a battery charge/discharge guide for performing battery conditioning when it is predicted that the battery charging efficiency will be low due to a low external temperature. The battery conditioning may include controlling a battery temperature to reach a room temperature (e.g., 20 to 25 degrees) to improve the battery charging efficiency. The processor 116 may control the battery temperature to improve the charging efficiency before the battery is charged through battery conditioning to shorten the charging time, thereby reducing charging costs.

Figure 8:
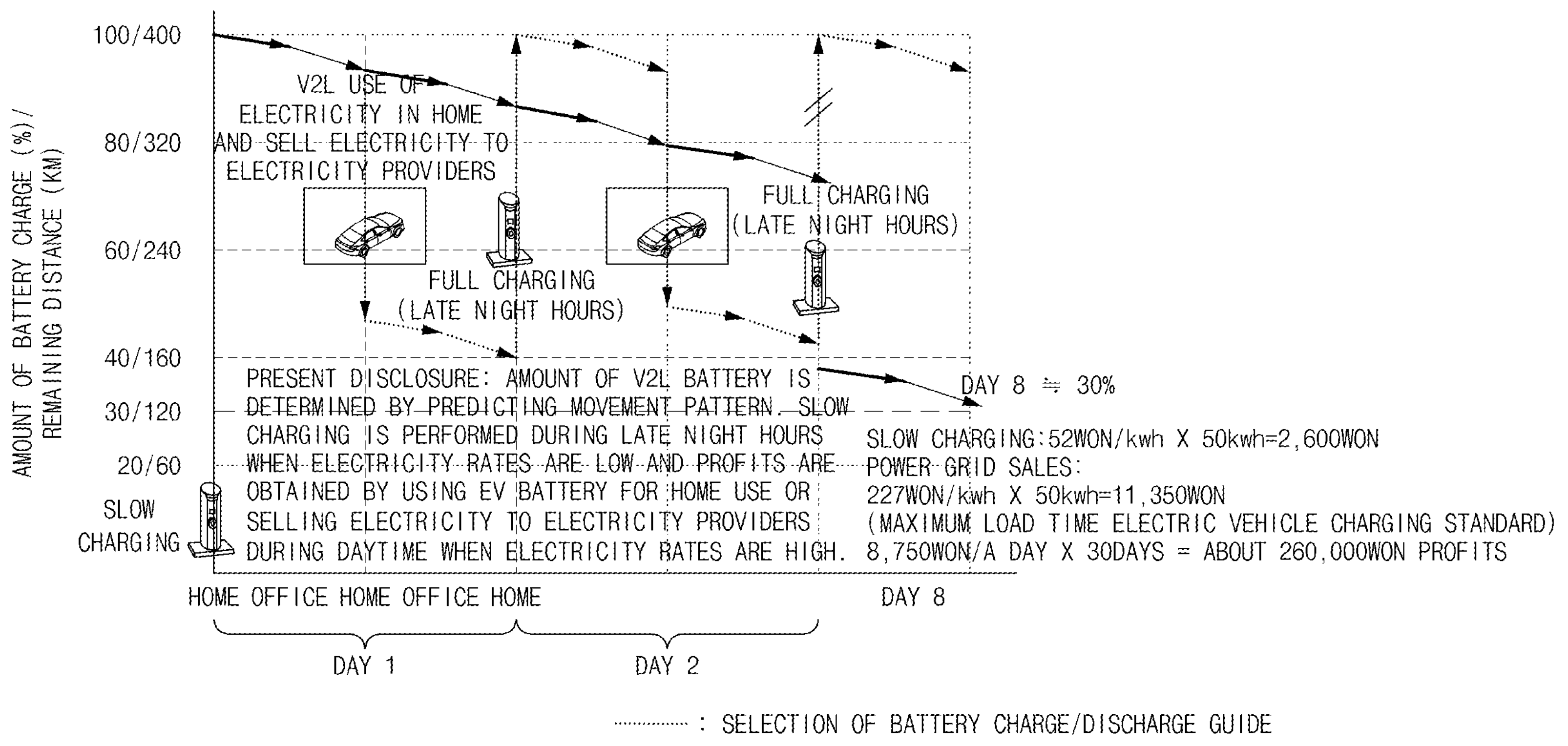

According to another implementation of the present disclosure, as shown in FIG. 8, the processor 116 may generate a battery charge/discharge guide when a slow charger is installed at home. According to an implementation, as shown in FIG. 8, the processor 116 may generate a battery charge/discharge guide that suggests that the battery be charged periodically for a predetermined period (e.g., 8 days) based on the movement of the vehicle 120. The processor 116 may suggest slow charging at night time when electricity rates are low when charging the vehicle battery using the slow charger installed at home through the battery charge/discharge guide, and suggest that the battery is used for operation of home electronic devices during the day and electricity is to be sold to an electric operator. The processor 116 may generate the above-described battery charge/discharge guide such that the user is able to earn about 260,000 won per month.

When the battery charge/discharge guide is generated, the processor 116 may transmit the battery charge/discharge guide to the vehicle 120.

When the battery charge/discharge guide is selected from the vehicle 120, the processor 116 may receive the selected battery charge guide information and store the received battery charge/discharge guide information. The processor 116 may update the movement pattern learning model by re-learning the user's movement path based on the stored battery charge/discharge guide information.

Figure 9:
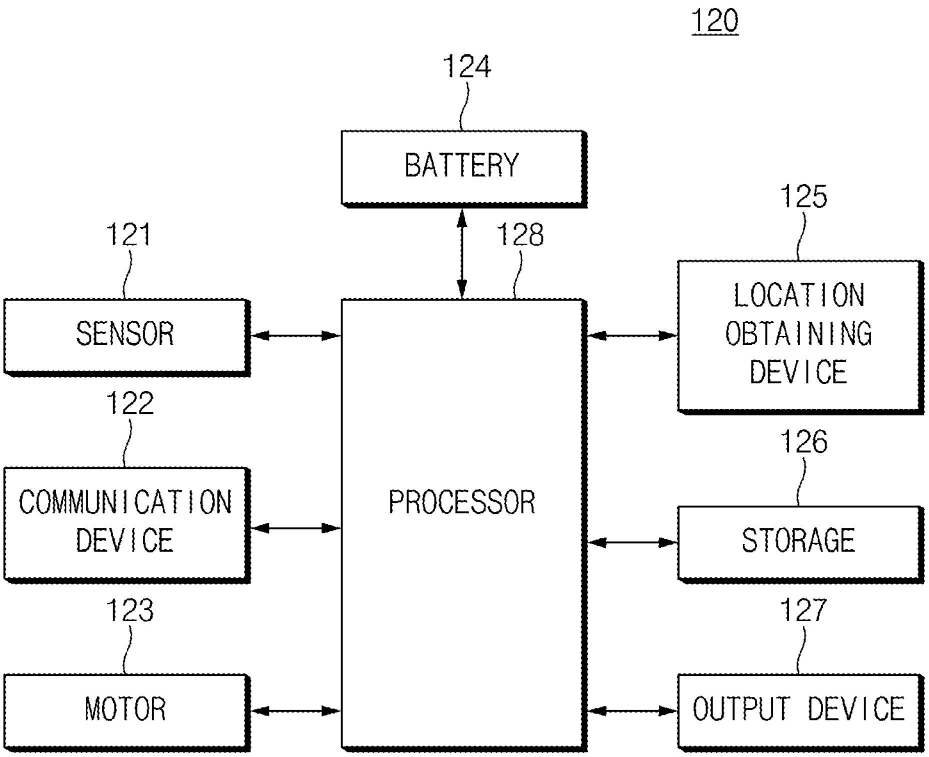
FIG. 9 is a diagram showing an example configuration of a vehicle according to an implementation of the present disclosure.

FIG. 9 is a diagram showing a configuration of a vehicle according to an implementation of the present disclosure.

Referring to FIG. 9, the vehicle 120 may include a sensor 121, a communication device 122, a motor 123, a battery 124, a location obtaining device 125, storage 126, an output device 127 and a processor 128.

The sensor 121 may detect a state of the vehicle. According to an implementation, the sensor 121 may include a battery sensor, a temperature sensor, a speed sensor, and the like, through which it is possible to obtain battery state information (battery voltage and current), an external temperature of the vehicle, and vehicle speed information.

The communication device 122 may perform wireless communication with the portable terminal 110. According to an implementation, the communication device 122 may communicate with the portable terminal 110 in various wireless communication methods including, for example, Wi-Fi, WiBro, Global System for Mobile Communication (GSM), Code Division Multiple Access (CDMA), Wideband Code Division Multiple Access (WCDMA), Universal Mobile Telecommunication System (UMTS), Time Division Multiple Access (TDMA), Long Term Evolution (LTE).

The motor 123 may provide a driving force for driving the wheels through rotational motion or generate power through regenerative braking.

The battery 124 may supply power to the motor 123 or may supply power to a vehicle electric device.

The location obtaining device 125 may be provided with a GPS receiver to obtain the location of the vehicle. Because the user moves while being on the vehicle, the location of the vehicle is preferably understood as the location of the user. The location obtaining device 125 may provide a map image of a certain area based on the location of the vehicle by performing map matching of the location of the vehicle to map data stored in advance, and provide a path from the current location to a destination set by the driver. The location obtaining device 125 may include a separate output device through which various types of information may be provided to the user. According to an implementation, the location obtaining device 125 may include an output device including a display device and a sound output device. The location obtaining device 125 may be implemented as a navigation system.

The storage 126 may store at least one or more algorithms for performing operations or execution of various commands for the operation of a vehicle according to an implementation of the present disclosure. Also, the storage 126 may store schedule information input by a user and user location information, and may store a learning model generated by the processor 128. The storage 126 may include at least one medium of a flash memory, a hard disk, a memory card, a Read-Only Memory (ROM), a Random Access Memory (RAM), an Electrically Erasable Programmable Read-Only Memory (EEPROM), a Programmable Read-Only Memory (PROM), a magnetic memory, a magnetic disk, and an optical disk.

The output device 127 may output an image or sound under the control of the processor 128. According to an implementation, the output device 127 may include a display device or a sound output device. The display device may be implemented with a touch screen panel to receive a user's input.

The processor 128 may be implemented by various processing devices such as a general-purpose microprocessor incorporating a semiconductor chip capable of operating or executing various instructions or the like and may control an operation of the vehicle according to an implementation of the present disclosure.

The processor 128 may obtain battery charging information. Here, the battery charging information may include a charging time zone, a state of charge, and a charging method of the battery. In addition, the processor 128 may obtain information on the state of charge and temperature of the battery, and transmit the information on the state of charge and temperature to the portable terminal 110. In addition, the processor 128 may calculate a battery usage according to the use of a vehicle electric device (electronic device), and calculate a battery usage according to the use of a cooling device or a heating device in the vehicle. In addition, the processor 128 may calculate a battery usage according to the power supplied to the motor 123 according to the movement of the vehicle. The processor 128 may calculate a total battery usage and transmit the total battery usage to the portable terminal 110.

When receiving a battery charge/discharge guide from the portable terminal 110, the processor 128 may output the battery charge/discharge guide through the output device 127. The processor 128 may determine whether the user has selected the battery charge/discharge guide output through the output device 127.

When it is determined that the user has selected the battery charge/discharge guide output through the output device 127, the processor 128 may generate and output a path to a destination based on a charging location suggested by the battery charge/discharge guide. In addition, the processor 128 may control charging and discharging of a vehicle battery based on a target amount of charge, a charging time zone, a charging method, a charging time, and battery conditioning suggested in the battery charge/discharge guide.

Figure 10:
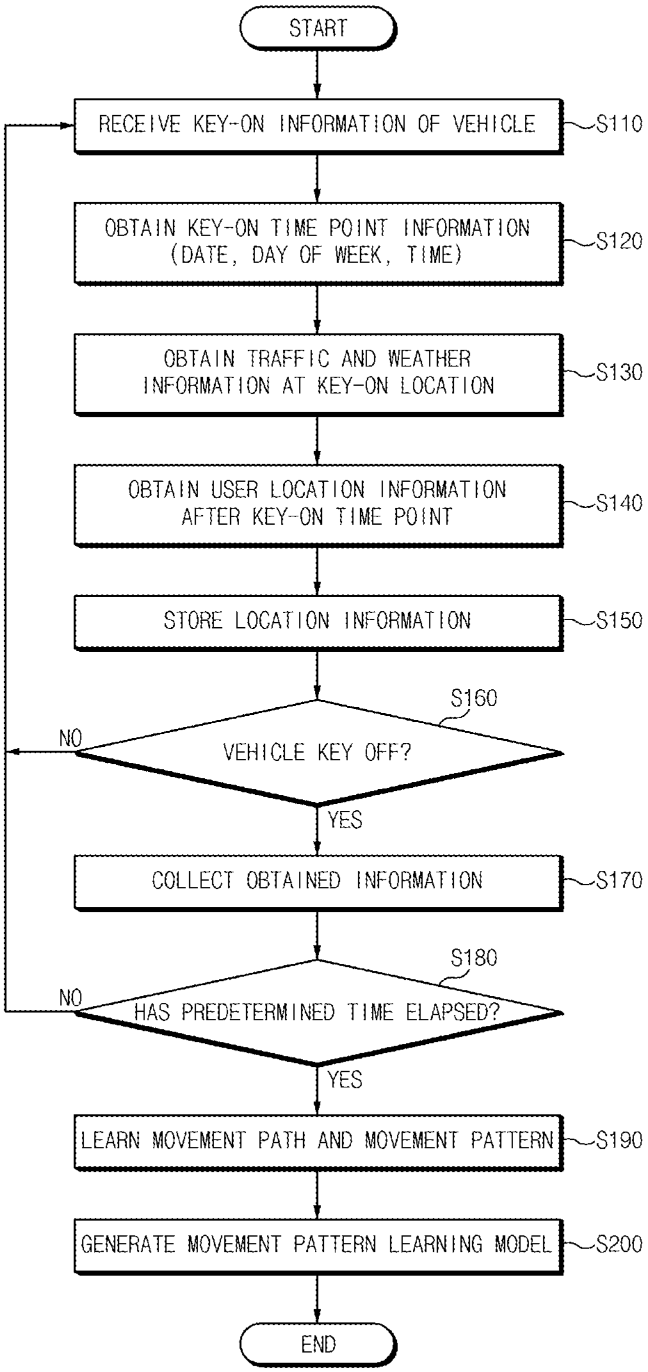
FIGS. 10 to 12 are diagrams illustrating an example method for controlling a vehicle battery according to an implementation of the present disclosure.
Figure 11:
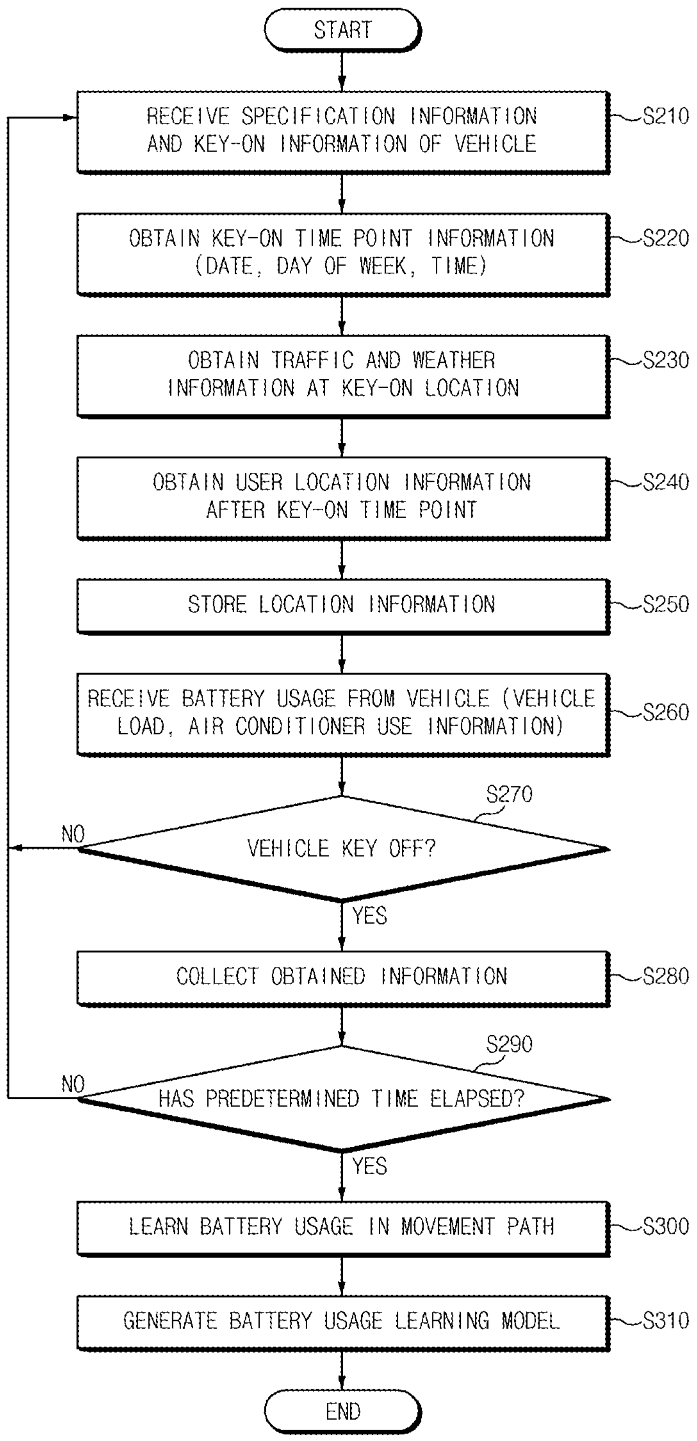
Figure 12:
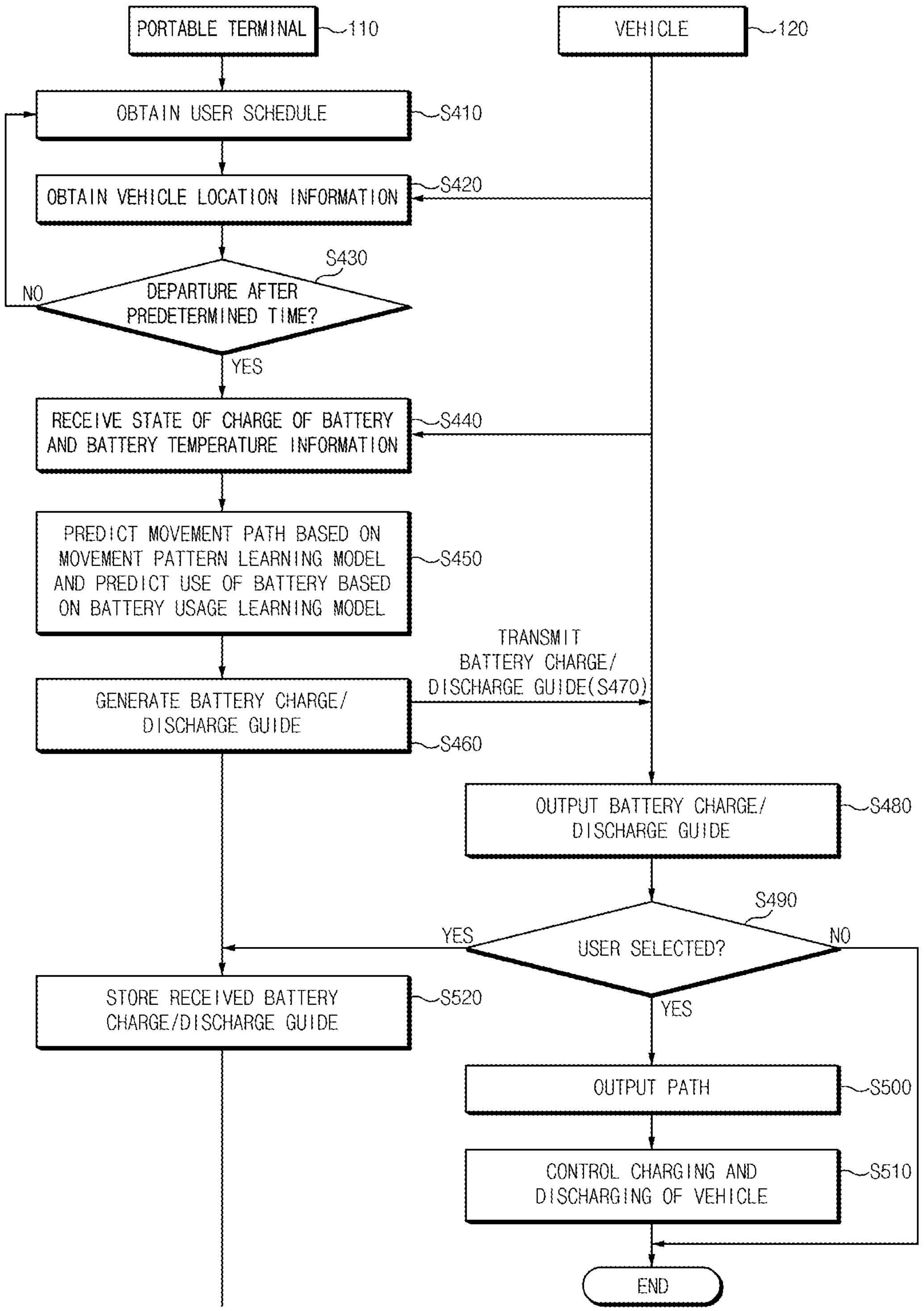

FIGS. 10 to 12 are diagrams illustrating a method for controlling a vehicle battery according to an implementation of the present disclosure.

Referring to FIG. 10, the portable terminal 110 may receive key-on information of the vehicle from the vehicle 120 (S110). Here, the key-on information is preferably understood as startup information.

When the key-on information is received, the portable terminal 110 may obtain key-on time point information (S120). Here, the key-on time point information may include a date, a day of the week, a time, and the like.

The portable terminal 110 may obtain traffic information and weather information (temperature) around the key-on location from a server (S130).

The portable terminal 110 may obtain user location information after the key-on time point (S140). According to an implementation, the portable terminal 110 may obtain location information according to the movement of the user after the key-on time point. Because the user is able to move while being on a vehicle, the user location information may be obtained from the location information of the vehicle. Also, because the portable terminal is carried by the user, the user location information may be obtained from the location of the portable terminal.

The portable terminal 110 may store location information according to the user's movement after performing map matching of the location information to a pre-stored map (S150).

The portable terminal 110 may determine whether the vehicle 120 is in a key-off state at a predetermined time period (S160).

When it is determined that the vehicle is not in the key-off state, the portable terminal 110 may perform S110 to receive information from the vehicle.

According to an implementation, the portable terminal 110 may determine that the vehicle 120 is in a key-off state when receiving key-off information from the vehicle 120. When it is determined that the vehicle 120 is in the key-off state, the portable terminal 110 may collect (store) information (key-on time point, user location information or the like) obtained after the key-on time point (S170). According to an implementation, the portable terminal 110 may collect (store) information obtained by the vehicle 120 from the key-on time point to the key-off time point during a predetermined period (e.g., 7 days).

The portable terminal 110 may determine whether a predetermined period has elapsed (S180). When the predetermined period has elapsed in S180, the portable terminal 110 may learn a movement path and a movement pattern for each key-on time point (date, day of the week, time) based on information collected during the predetermined period (S190). When it is determined in S180 that the predetermined period has not elapsed, the portable terminal 110 may repeatedly perform operations S110 to S170 for the predetermined period (e.g., 7 days).

The portable terminal 110 may generate a movement pattern learning model based on information collected for the predetermined period (S200).

Referring to FIG. 11, the portable terminal 110 may receive specification information (vehicle weight, in-vehicle load information, and the like) and receive key-on information of the vehicle from the vehicle 120 (S210). Here, the key-on information is preferably understood as startup information.

When the key-on information is received, the portable terminal 110 may obtain key-on time point information (S220). Here, the key-on time point information may include a date, a day of the week, a time, and the like.

The portable terminal 110 may obtain traffic information and weather information (temperature) around the key-on location from a server (S230).

The portable terminal 110 may obtain user location information after the key-on time point (S240). According to an implementation, the portable terminal 110 may obtain location information according to the movement of the user after the key-on time point. Because the user is able to move while being on a vehicle, the user location information may be obtained from the location information of the vehicle. Also, because the portable terminal is carried by the user, the user location information may be obtained from the location of the portable terminal.

The portable terminal 110 may store location information according to the user's movement after performing map matching of the location information to a pre-stored map (S250).

The portable terminal 110 may receive battery usages according to vehicle movement, vehicle load usage, and air conditioning equipment usage from the vehicle 120 (S260).

The portable terminal 110 may determine whether the vehicle 120 is in a key-off state at a predetermined time period (S270). According to an implementation, the portable terminal 110 may determine that the vehicle 120 is in a key-off state when receiving key-off information from the vehicle 120.

When it is determined that the vehicle is not in the key-off state, the portable terminal 110 may perform S210 to receive information from the vehicle.

When it is determined that the vehicle 120 is in the key-off state, the portable terminal 110 may collect (store) information (key-on time point, user location information, battery usage or the like) obtained after the key-on time point (S280). According to an implementation, in S280, the portable terminal 110 may obtain and collect user location information and battery usage from the key-on time point to the key-off time point for a predetermined period (e.g., 7 days), and receive and collect the battery usage calculated based on the usage of an in-vehicle load (electronic device) and the usage of an air conditioning device.

The portable terminal 110 may determine whether a predetermined period has elapsed (S290). When the predetermined period has elapsed in S290, the portable terminal 110 may learn a movement path and a movement pattern for each key-on time point (date, day of the week, time) based on information collected during the predetermined period (S300). When it is determined in S290 that the predetermined period has not elapsed, the portable terminal 110 may repeatedly perform operations S210 to S280 for the predetermined period (e.g., 7 days).

The portable terminal 110 may generate a battery usage learning model based on information collected for the predetermined period (S310).

Referring to FIG. 12, the portable terminal 110 may obtain a user schedule (S410). In addition, the portable terminal 110 may obtain location information of the vehicle from the vehicle 120 (S420).

The portable terminal 110 may determine whether the vehicle departs after a predetermined time (e.g., 30 minutes) based on the user schedule (S430). When it is determined that the vehicle will depart after a predetermined time, the portable terminal 110 may receive information on a state of charge and temperature of the battery from the vehicle 120.

The portable terminal 110 may predict the movement of the vehicle based on the movement pattern learning model generated through the operations of FIGS. 10 and 11 and predict the battery usage based on the battery usage learning model (S450).

The portable terminal 110 may generate a battery charge/discharge guide when the movement of the vehicle and the use of the battery are predicted (S460).

The portable terminal 110 may transmit the battery charge/discharge guide to the vehicle 120 (S470), and the vehicle 120 may output the battery charge/discharge guide received from the portable terminal 110 (S480).

The vehicle 120 may determine whether the user has selected the battery charge/discharge guide output through the output device 127 (S490).

When it is determined that the user has selected the battery charge/discharge guide output through the output device 127, the vehicle 120 may generate and output a movement path to a destination based on a charging location suggested by the battery charge/discharge guide (S500). In addition, the vehicle 120 may control charging and discharging of a vehicle battery based on a target amount of charge, a charging time zone, a charging method, a charging time, and battery conditioning suggested in the battery charge/discharge guide (S510).

Also, when the vehicle 120 determines that the user has selected the battery charge/discharge guide output through the output device 127, the vehicle 120 may transmit the selected battery charging guide information to the portable terminal 110. The portable terminal 110 may store the received battery charge/discharge guide information (S520). The portable terminal 110 may update the movement pattern learning model by re-learning the user's movement path based on the battery charge/discharge guide information stored in S520.

Figure 13:
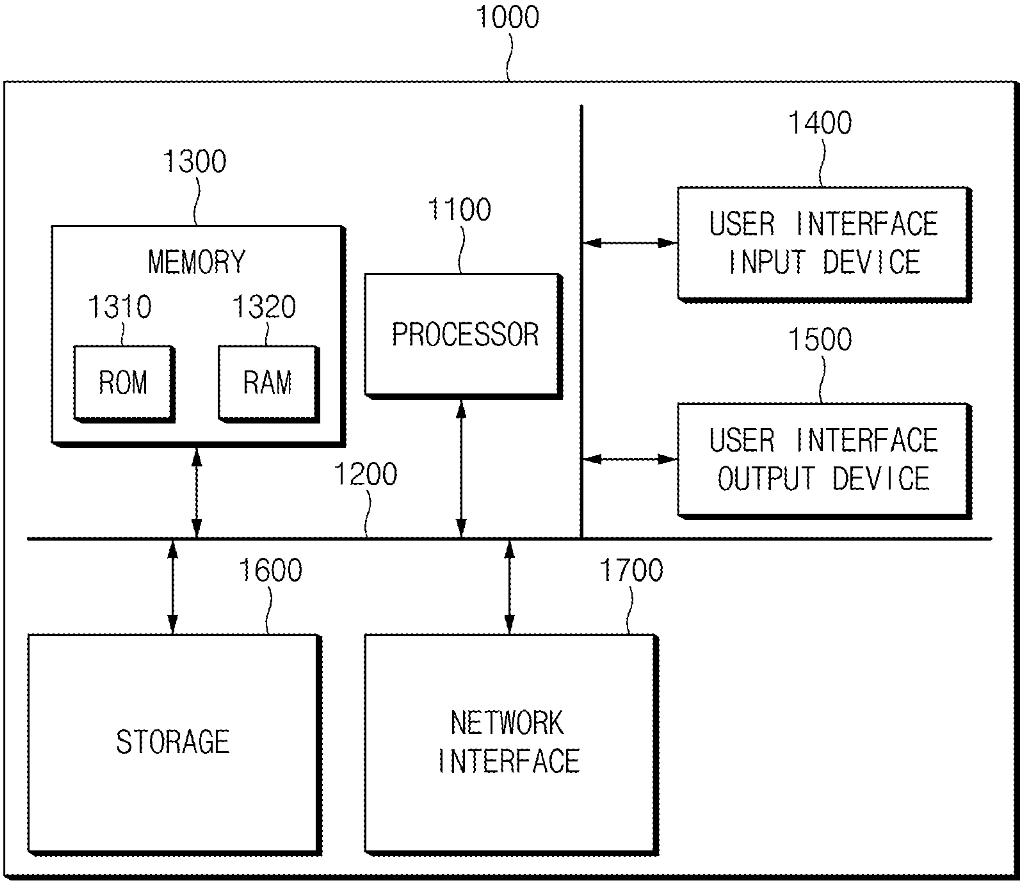
FIG. 13 is a diagram illustrating an example configuration of a computing system for executing a method according to an implementation of the present disclosure.

FIG. 13 is a diagram illustrating a configuration of a computing system for executing a method according to an implementation of the present disclosure.

Referring to FIG. 13, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the implementations disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The above description is merely illustrative of the technical idea of the present disclosure, and various modifications and variations may be made without departing from the essential characteristics of the present disclosure by those skilled in the art to which the present disclosure pertains.

Therefore, the exemplary implementations of the present disclosure are provided to explain the spirit and scope of the present disclosure, but not to limit them, so that the spirit and scope of the present disclosure is not limited by the implementations. The scope of protection of the present disclosure should be interpreted by the following claims, and all technical ideas within the scope equivalent thereto should be construed as being included in the scope of the present disclosure.

The system and method for controlling a vehicle battery according to an implementation of the present disclosure can help minimize the anxiety and inconvenience aggravated to a user during charging and discharging of an electric vehicle, and also can help minimize the maintenance costs of the electric vehicle.

Although the present disclosure has been described with reference to exemplary implementations and the accompanying drawings, the present disclosure is not limited thereto, and may be variously modified and altered by those skilled in the art to which the present disclosure pertains without departing from the spirit and scope of the present disclosure claimed in the following claims.

What is claimed is:

1. A vehicle battery system, comprising:

a vehicle including:

a motor configured to provide a driving force or generate power through regenerative braking, and a battery configured to provide power to the motor, wherein the vehicle is configured to calculate a battery usage information according to a use of the battery; and a portable terminal configured to (i) obtain location information of a user, (ii) generate a battery charge/discharge guide based on the location information of the user and the battery usage information received from the vehicle, and (iii) transmit the battery charge/discharge guide to the vehicle, wherein the portable terminal is configured to generate a movement pattern learning model by learning a movement path of the user based on the location information.

2. The system of claim 1, wherein the portable terminal is configured to receive the battery usage information from the vehicle to thereby generate a battery usage learning model by learning the battery usage information.

3. The system of claim 2, wherein the portable terminal is configured to (i) predict a movement path of the vehicle based on the movement pattern learning model, (ii) predict battery usage information based on the battery usage learning model, and (iii) generate the battery charge/discharge guide.

4. The system of claim 1, wherein the vehicle is configured to calculate the battery usage information based on (i) a movement path of the vehicle, (ii) a power usage of an in-vehicle load, and (iii) a power usage of an air conditioning device.

5. The system of claim 3, wherein the vehicle is configured to determine whether the user has selected the battery charge/discharge guide based on the battery charge/discharge guide being received.

6. The system of claim 5, wherein the vehicle is configured to output a predicted movement path and control charging and discharging of the battery according to the battery charge/discharge guide based on determining that the battery charge/discharge guide is selected by the user.

7. The system of claim 5, wherein the vehicle is configured to perform battery conditioning of the battery based on determining that the battery charge/discharge guide is selected by the user.

8. The system of claim 7, wherein the vehicle is configured to transmit selection information to the portable terminal based on determining that the battery charge/discharge guide is selected by the user.

9. The system of claim 8, wherein the portable terminal is configured to receive the selection information and re-learn the movement path of the user.

10. A method for controlling a battery of a vehicle, comprising:

obtaining, by a portable terminal, location information of a user;

receiving, by the portable terminal, battery usage information according to use of the battery from the vehicle;

generating, by the portable terminal, a battery charge/discharge guide based on the location information of the user and the battery usage information received from the vehicle; and transmitting, by the portable terminal, the battery charge/discharge guide to the vehicle, wherein the method further comprises generating, by the portable terminal, a movement pattern learning model by learning a movement path of the user based on the location information.

11. The method of claim 10, further comprising:

receiving, by the portable terminal, the battery usage information from the vehicle, and generating a battery usage learning model by learning the battery usage information.

12. The method of claim 11, further comprising:

predicting, by the portable terminal, a movement path of the vehicle based on the movement pattern learning model;

predicting, by the portable terminal, battery usage information based on the battery usage learning model; and generating, by the portable terminal, the battery charge/discharge guide.

13. The method of claim 10, further comprising:

calculating, by the vehicle, the battery usage information based on a movement path of the vehicle, a power usage of an in-vehicle load, and a power usage of an air conditioning device.

14. The method of claim 12, further comprising:

determining, by the vehicle, whether the user has selected the battery charge/discharge guide, based on the battery charge/discharge guide being received.

15. The method of claim 14, further comprising:

outputting, by the vehicle, a predicted movement path and controlling charging and discharging of the battery according to the battery charge/discharge guide based on determining that the user has selected the battery charge/discharge guide.

16. The method of claim 14, further comprising:

performing, by the vehicle, battery conditioning of the battery based on determining that the user has selected the battery charge/discharge guide.

17. The method of claim 16, further comprising:

transmitting, by the vehicle, selection information to the portable terminal based on determining that the battery charge/discharge guide is selected by the user.

18. The method of claim 17, further comprising receiving, by the portable terminal, the selection information and re-learning the movement path of the user.

* * * * *